United States Patent
Lee et al.

(10) Patent No.: US 12,515,428 B2
(45) Date of Patent: Jan. 6, 2026

(54) METHOD FOR MANUFACTURING INTERIOR PARTS FOR VEHICLE USING REAL MATERIAL

(71) Applicants: Hyundai Motor Company, Seoul (KR); Kia Corporation, Seoul (KR)

(72) Inventors: Young Ju Lee, Suwon-si (KR); Hong Sik Chang, Hwaseong-si (KR); Kwang Pyo Cho, Gwangmyeong-si (KR); Seung Sik Han, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 159 days.

(21) Appl. No.: 18/532,618

(22) Filed: Dec. 7, 2023

(65) Prior Publication Data
US 2025/0050607 A1    Feb. 13, 2025

(30) Foreign Application Priority Data
Aug. 7, 2023   (KR) .................. 10-2023-0102850

(51) Int. Cl.
| | | |
|---|---|---|
| *B29D 99/00* | (2010.01) | |
| *B29C 35/08* | (2006.01) | |
| *B29C 45/00* | (2006.01) | |
| *B29C 45/14* | (2006.01) | |
| *B29C 45/53* | (2006.01) | |

(Continued)

(52) U.S. Cl.
CPC ............ *B29D 99/001* (2013.01); *B29C 35/08* (2013.01); *B29C 45/0055* (2013.01);
(Continued)

(58) Field of Classification Search
CPC .............. B29D 99/001; B29C 45/1418; B29C 45/0055
See application file for complete search history.

(56) References Cited

U.S. PATENT DOCUMENTS

2012/0074725 A1* 3/2012 Jeon ................ B60R 13/02
                                                      362/509
2018/0120970 A1* 5/2018 Lee ................. G06F 3/0202
(Continued)

FOREIGN PATENT DOCUMENTS

CN    101468783 A  *  7/2009
CN    108715909 A  * 10/2018  ............. C14C 11/00
(Continued)

OTHER PUBLICATIONS

Machine translation CN101468783A (Year: 2009).*
(Continued)

*Primary Examiner* — Abbas Rashid
*Assistant Examiner* — Wayne K. Swier
(74) *Attorney, Agent, or Firm* — Slater Matsil, LLP (57) ABSTRACT

An embodiment method of manufacturing an interior component for a vehicle using a real material includes bonding a plurality of laminated printed layers on a rear surface of the real material, injection-molding an injection-molded product that processes a shape by putting the real material into a molding mold and laminating the real material on the injection-molded product injection-molded in a shape corresponding to the processed shape of the real material, forming a light-transmitting part that processes a symbol part on a front surface of the real material and forming a light-transmitting part protruding in a shape of the symbol part, and mounting a light source unit on the injection-molded product, the light source unit configured to be selectively lighted through the light-transmitting part in response to detecting a change in a capacitance from the front surface of the real material.

18 Claims, 10 Drawing Sheets

(51) Int. Cl.
  *B29K 63/00* (2006.01)
  *B29K 709/00* (2006.01)
  *B29K 711/14* (2006.01)
  *B29L 31/30* (2006.01)

(52) U.S. Cl.
  CPC .... *B29C 45/1418* (2013.01); *B29C 45/14336* (2013.01); *B29C 45/53* (2013.01); *B29C 2045/0075* (2013.01); *B29C 2045/0079* (2013.01); *B29C 2045/14213* (2013.01); *B29C 2045/14286* (2013.01); *B29K 2063/00* (2013.01); *B29K 2709/14* (2013.01); *B29K 2711/14* (2013.01); *B29L 2031/3041* (2013.01)

(56) References Cited

U.S. PATENT DOCUMENTS

| | | | | |
|---|---|---|---|---|
| 2021/0157238 | A1* | 5/2021 | Toker | G03F 7/164 |
| 2021/0388146 | A1* | 12/2021 | Seo | B32B 27/308 |
| 2023/0356652 | A1 | 11/2023 | Kim et al. | |

FOREIGN PATENT DOCUMENTS

| | | | | |
|---|---|---|---|---|
| CN | 108891363 | A | | 11/2018 |
| CN | 111674336 | A | | 9/2020 |
| JP | 2003332073 | A | * | 11/2003 |
| JP | 4651916 | B2 | * | 3/2011 |
| KR | 20180088060 | A | | 8/2018 |
| KR | 20230109803 | A | | 7/2023 |
| KR | 20230109804 | A | | 7/2023 |
| KR | 20230113430 | A | | 7/2023 |
| KR | 20230156859 | A | | 11/2023 |
| WO | WO-2014138063 | A1 | * | 9/2014 ............... B60Q 3/74 |

OTHER PUBLICATIONS

Machine translation CN108715909A (Year: 2018).*
Machine translation JP2003332073A (Year: 2003).*
Machine translation JP4651916B2 (Year: 2011).*
Machine translation CN108891363A (Year: 2018).*
Machine translation CN111674336A (Year: 2020).*

* cited by examiner

[ LIGHTING OFF ]

FIG. 9B

[ LIGHTING ON ]

METHOD FOR MANUFACTURING INTERIOR PARTS FOR VEHICLE USING REAL MATERIAL

CROSS-REFERENCE TO RELATED APPLICATIONS

This application claims the benefit of Korean Patent Application No. 10-2023-0102850, filed on Aug. 7, 2023, which application is hereby incorporated herein by reference.

TECHNICAL FIELD

The present disclosure relates to a method of manufacturing an interior component for a vehicle.

BACKGROUND

In general, since interior materials for a vehicle require a beautiful exterior and luxurious texture, real materials such as real wood, real aluminum, carbon woven fabric, and mother-of-pearl have been used as materials for decoration of the interior materials for a vehicle.

Among them, real wood is widely used as door trim garnishes for a vehicle, door trim switches, and other interior decoration components because it has the characteristics capable of realizing the advancement and eco-friendly image of a vehicle.

Meanwhile, the conventional mechanical button is configured so that light emitted from a light emitting diode (LED) is transmitted through an empty space of a button mechanism to transmit a surface of the button, and when a person manually presses the button using a push-pull type mechanical contact point, a switch operation is possible through electricity.

Here, the light emitted from the LED is configured to transmit the button made of a normal light-transmitting plastic material (polycarbonate (PC)) and having visible light transmittance (in a range of 5 to 18%).

On the other hand, unlike mechanical buttons, a touch electrode is made of a conductive material and is a device for recognizing ON/OFF by detecting a change in a signal to an initial capacitance when a person's hand approaches, and the touch electrode is excellent because it may generate a larger capacitance as a material has higher electrical conductivity.

The touch electrode may be applied to real materials widely used as door trim garnishes for a vehicle, door trim switches, and other interior decoration components, and to this end, application of a method for minimizing breakage, exterior damage, and the like upon molding the real materials may be essential.

SUMMARY

The present disclosure relates to a method of manufacturing an interior component for a vehicle using a real material, and more specifically, to a method of manufacturing an interior component for a vehicle using a real material, which may minimize cracking and exterior damage through molding considering the characteristics of the real material.

The present disclosure is directed to providing a method of manufacturing an interior component for a vehicle using a real material, which may minimize breakage and exterior damage of the real material through manufacturing considering the characteristics of the real material even while securing visibility of a symbol on a front surface of the real material by manufacturing the interior component for a vehicle using the real material such as real wood and real stone, and manufacturing the interior component in which a touch switch is applied to the front surface of the real material and a symbol corresponding to the touch switch is transmitted to the outside from the front surface of the real material by a light source.

A method of manufacturing an interior component for a vehicle using a real material according to one embodiment of the present disclosure includes a bonding operation of bonding a plurality of laminated printed layers on a rear surface of the real material, an operation of injection-molding an injection-molded product that processes a shape by putting the real material into a molding mold and laminates the real material on the injection-molded product injection-molded in a shape corresponding to the processed shape of the real material, an operation of forming a light-transmitting part that processes a symbol part on a front surface of the real material and forming a light-transmitting part protruding in a shape of the symbol part, and an operation of mounting a light source unit on the injection-molded product, the light source unit configured to be selectively lighted through the light-transmitting part by detecting a change in a capacitance from the front surface of the real material.

The operation of injection-molding the injection-molded product may include processing a shape of the real material by simultaneously providing pressure and vacuum to the real material in a state of heating the molding mold.

In addition, the bonding operation may include bonding the plurality of laminated printed layers including a nonwoven fabric on the rear surface of the real material.

In addition, the operation of forming the light-transmitting part may include an operation of performing laser processing along a shape of the symbol part printed on the front surface of the real material so that a light-transmitting region is formed in the real material, an operation of implementing an embossing that laminates a silicon pad part on the front surface of the real material and allows the light-transmitting region to extend to the silicon pad part, an operation of injecting a resin into the light-transmitting region, an operation of curing the resin by irradiating ultraviolet rays to the silicon pad part, and an operation of removing the silicon pad part from the real material.

The operation of performing the laser processing may include performing laser processing so that the light-transmitting region is formed at a predetermined depth including all of the real material, the printed layer, and a portion of the injection-molded product.

In addition, the operation of implementing the embossing may include forming a plurality of light-transmitting regions extending to a symbol processing part from the front surface of the real material as the symbol processing part having the same shape as the symbol part is engraved in the silicon pad part.

In addition, the operation of injecting the resin may include supplying a resin to the plurality of light-transmitting regions by injecting the resin through a plurality of supply flow paths formed in the silicon pad part.

In addition, the operation of forming the light-transmitting part may further include an operation of applying a waterproofing agent to the front surface of the real material in a state in which the light-transmitting part is formed to protrude from the front surface of the real material after the silicon pad part is removed.

The operation of forming the light-transmitting part may include an operation of attaching a film on which the symbol part is printed to the front surface of the real material, an operation of performing laser processing along a shape of the symbol part printed on the front surface of the film so that a light-transmitting region is formed in the real material, an operation of injecting a resin into the light-transmitting region, an operation of curing the resin by irradiating ultraviolet rays to the film including the light-transmitting region, and an operation of removing the film from the real material.

The operation of performing the laser processing may include performing laser processing so that the light-transmitting region is formed at a predetermined depth including all of the film, the real material, the printed layer, and a portion of the injection-molded product.

In addition, the operation of injecting the resin may include supplying the resin to each of the plurality of light-transmitting regions by injecting the resin through a supply flow path connected to the light-transmitting region.

In addition, the operation of forming the light-transmitting part may further include an operation of applying a waterproofing agent to the front surface of the real material in a state in which the light-transmitting part is formed to protrude from the front surface of the real material after the film is removed.

The operation of forming the light-transmitting part may include an operation of performing laser processing along a shape of the symbol part printed on the front surface of the real material so that a light-transmitting region is formed in the real material, an operation of applying a resin to the front surface of the real material and forming a resin layer on the front surface of the real material including the light-transmitting region by pressing, an operation of positioning the resin layer on a film in which the symbol part is printed on a front surface and selectively curing the resin layer of the light-transmitting region by irradiating ultraviolet rays, and an operation of sequentially removing the film and a non-cured resin layer from the real material.

The operation of performing the laser processing may include performing laser processing so that the light-transmitting region is formed at a predetermined depth including all of the real material, the printed layer, and a portion of the injection-molded product.

In addition, the operation of forming the light-transmitting part may further include an operation of applying a waterproofing agent to the front surface of the real material in a state in which the light-transmitting part is formed to protrude from the front surface of the real material after the film and the non-cured resin layer are sequentially removed.

The real material may be real wood.

A method of manufacturing an interior component for a vehicle using a real material according to an embodiment of the present disclosure includes a bonding operation of bonding a plurality of laminated printed layers on a rear surface of the real material, an operation of injection-molding an injection-molded product that processes a shape by putting the real material into a molding mold and laminates the real material on the injection-molded product injection-molded in a shape corresponding to the processed shape of the real material, and an operation of mounting a light source unit on the injection-molded product, the light source unit configured to be selectively lighted through the light-transmitting part by detecting a change in a capacitance from the front surface of the real material.

The operation of injection-molding the injection-molded product may include processing a shape of the real material by simultaneously providing pressure and vacuum to the real material in a state of heating the molding mold.

In addition, the bonding operation may include bonding the plurality of laminated printed layers including a non-woven fabric on the rear surface of the real material.

The real material may be real stone.

According to an embodiment of the present disclosure, it is possible to minimize breakage and exterior damage of the real material through manufacturing considering the characteristics of the real material even while securing visibility of the symbol on the front surface of the real material by manufacturing the interior component for a vehicle using the real material such as real wood and real stone, and manufacturing interior component in which the touch switch is applied to the front surface of the real material and the symbol corresponding to the touch switch is transmitted to the outside from the front surface of the real material by the light source.

In addition, according to an embodiment of the present disclosure, it is possible to realize lighting uniformness and the sense of touch for the symbol on the front surface of the real material by processing and mounting a light source module for allowing the symbol to be transmitted to the outside of the real material through injection-molding corresponding to the shape of the real material when the light source module is mounted.

It can be understood that the term "automotive" or "vehicular" or other similar term as used herein can be inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

BRIEF DESCRIPTION OF THE DRAWINGS

The above and other features of the present disclosure are described in detail with reference to certain exemplary examples thereof illustrated in the accompanying drawings which are given for illustration, and thus are not necessarily limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes can be determined in section by the particular intended application and use environment.

In the figures, reference numbers refer to the same or equivalent sections of the present disclosure throughout the several figures of the drawing.

DETAILED DESCRIPTION OF ILLUSTRATIVE EMBODIMENTS

Embodiments of the present disclosure will be described in detail with reference to the accompanying drawings. Advantages and features of embodiments of the present disclosure and methods for achieving them can become clear with reference to embodiments described below in detail in conjunction with the accompanying drawings.

However, the present disclosure is not necessarily limited to the embodiments disclosed below and can be implemented in various different forms. These embodiments are merely provided to make the disclosure of the present disclosure complete and fully inform those skilled in the art to which the present disclosure pertains completely of the scope of the present disclosure, and the scope of the present disclosure is defined by the appended claims.

In addition, in the description of the present disclosure, when it is determined that related known technologies may obscure the gist of the present disclosure, a detailed description thereof can be omitted.

Figure 1:
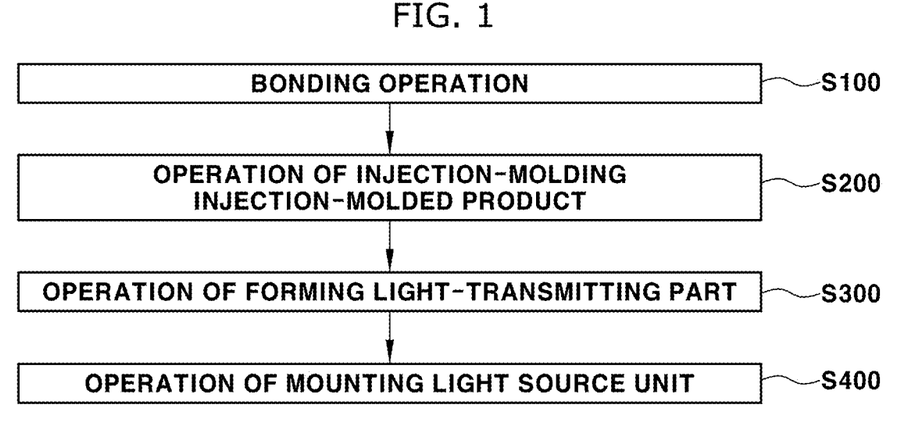
FIG. 1 is a view sequentially illustrating a method of manufacturing an interior component using a real material according to an embodiment of the present disclosure.
Figure 2:
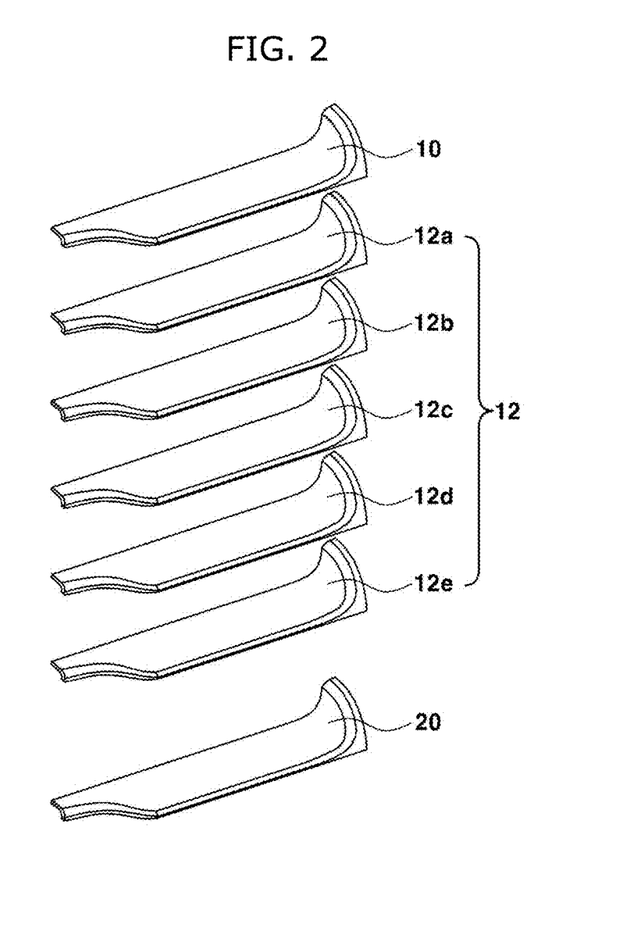
FIG. 2 is a view illustrating a printed layer in the method of manufacturing the interior component using the real material according to an embodiment of the present disclosure.
Figure 3A:
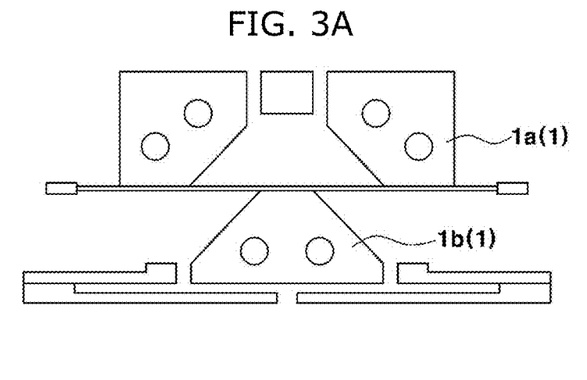
FIGS. 3A and 3B are views illustrating a molding process of the real material in the method of manufacturing the interior component using the real material according to an embodiment of the present disclosure.
Figure 3B:
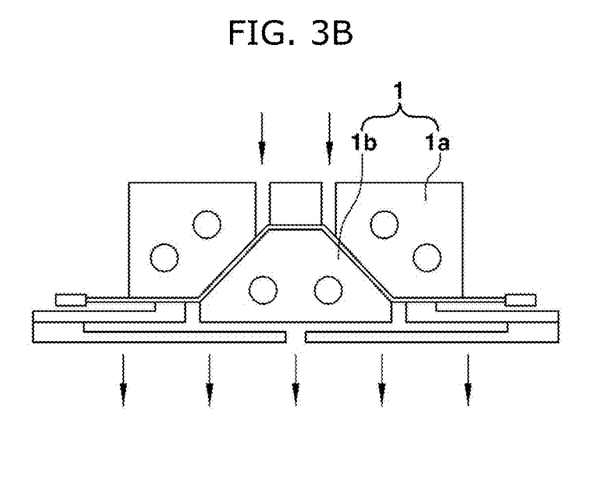

FIG. 1 is a view sequentially illustrating a method of manufacturing an interior component using a real material according to an embodiment of the present disclosure. FIG. 2 is a view illustrating a printed layer in the method of manufacturing the interior component using the real material according to an embodiment of the present disclosure. FIGS. 3A and 3B are views illustrating a molding process of the real material in the method of manufacturing the interior component using the real material according to an embodiment of the present disclosure.

FIGS. 4 to 8 are views sequentially illustrating a first embodiment of an operation of forming a light-transmitting part in the method of manufacturing the interior component using the real material according to an embodiment of the present disclosure. FIGS. 9A and 9B are views illustrating ON/OFF states of a light source unit in the method of manufacturing the interior component using the real material according to an embodiment of the present disclosure. FIGS. 10 to 15 are views sequentially illustrating a second embodiment of an operation of forming the light-transmitting part in the method of manufacturing the interior component using the real material according to an embodiment of the present disclosure. FIGS. 16 to 21 are views sequentially illustrating a third embodiment of the operation of forming the light-transmitting part in the method of manufacturing the interior component using the real material according to an embodiment of the present disclosure.

As illustrated in FIG. 1, a method of manufacturing an interior component for a vehicle using a real material according to an embodiment will be sequentially described as follows.

First, a plurality of laminated printed layers 12 are bonded to a rear surface of a real material 10 (operation S100).

This is for minimizing cracking and exterior damage of the real material 10 due to an impact or the like by providing a buffering effect for the real material 10 made of real wood by bonding a plurality of laminated printed layers 12 including a non-woven fabric 12d to the rear surface of the real material 10.

In other words, as illustrated in FIG. 2, in an embodiment, the printed layer 12 includes a backing 12a, a primer and black ink 12b, a thermoplastic polyurethane (TPU) 12c, a non-woven fabric 12d, and a formable layer 12e, and as described above, the plurality of laminated printed layers 12 are formed by adding the non-woven fabric 12d together with the TPU 12c made of an elastic material and provided to absorb an impact, thereby enabling buffering for real wood that is easily broken (damaged).

Next, the real material 10 is processed in a required shape by being put into a molding mold 1 composed of an upper mold 1a and a lower mold 1b, and the real material 10 is laminated on an injection-molded product 20 injected in a shape corresponding to the processed shape of the real material 10 (operation S200).

As described above, to mold the real material 10 including the printed layer 12, first, as illustrated in FIG. 3A, in a state in which the molding mold 1 is heated, as illustrated in FIG. 3B, the shape of the real material 10 is processed by simultaneously providing pressure and vacuum to the real material 10.

In other words, in the related art, because molding is performed by directly applying heat to a material, the material is damaged by the applied heat, and because a lifting phenomenon or the like occurs after molding in a bent region of a molded region, the real material 10 is processed by a molding process considering the characteristics of the real material 10 such as real wood or real stone, specifically in an embodiment, operating the molding mold 1 in a vertical direction through pressure and vacuum moldings in a state of heating the molding mold 1, and thus it is possible to not only improve moldability of the real material 10 but also minimize breakage and exterior damage of the real material 10 compared to the related art.

Next, in an embodiment, a symbol part 11 is processed on a front surface of the real material 10, and a light-transmitting part 14 protruding in the shape of the symbol part 11 is formed (operation S300).

The first to third embodiments in which the light-transmitting part 14 is formed on the real material 10 will be sequentially described as follows.

First Embodiment

Figure 4:
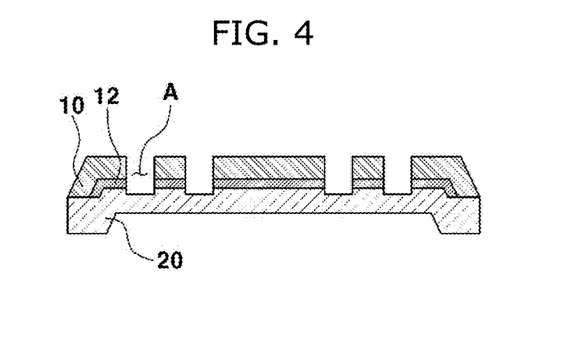
FIGS. 4 to 8 are views sequentially illustrating a first embodiment of an operation of forming a light-transmitting part in a method of manufacturing the interior component using the real material according to an embodiment of the present disclosure.

As illustrated in FIG. 4, in a first embodiment, laser processing is performed along the shape of the symbol part 11 printed on the front surface of the real material 10 to form a light-transmitting region A in the real material 10.

In the first embodiment, during laser processing, the light-transmitting region A is processed to be formed at a selected or predetermined depth including all of the real material 10, the printed layer 12, and a portion of the injection-molded product 20, which is for allowing the real material 10 including the printed layer 12 and the injection-molded product 20 to be stably bonded without a gap as a resin 40 is injected and cured thereafter.

Figure 5:
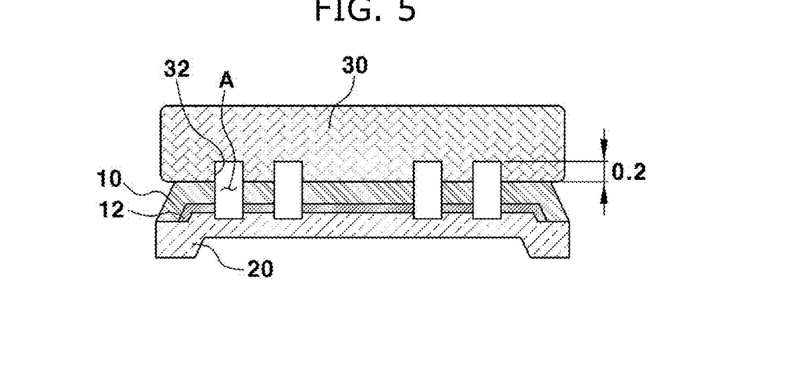

As illustrated in FIG. 5 in a state in which the light-transmitting region A is formed through laser processing, a silicon pad part 30 is laminated on the front surface of the real material 10, and thus the light-transmitting region A extends to the silicon pad part 30.

In other words, as a symbol processing part 32 having the same shape as the symbol part 11 is engraved in the silicon pad part 30, a plurality of light-transmitting regions A extending to the symbol processing part 32 from the front surface of the real material 10 are formed.

In the first embodiment, because the symbol processing part 32 has the symbol part 11 engraved in the silicon pad part 30 at 0.2 cm in depth, the light-transmitting region A may also extend to protrude from the front surface of the real material 10 by 0.2 cm.

Figure 6:
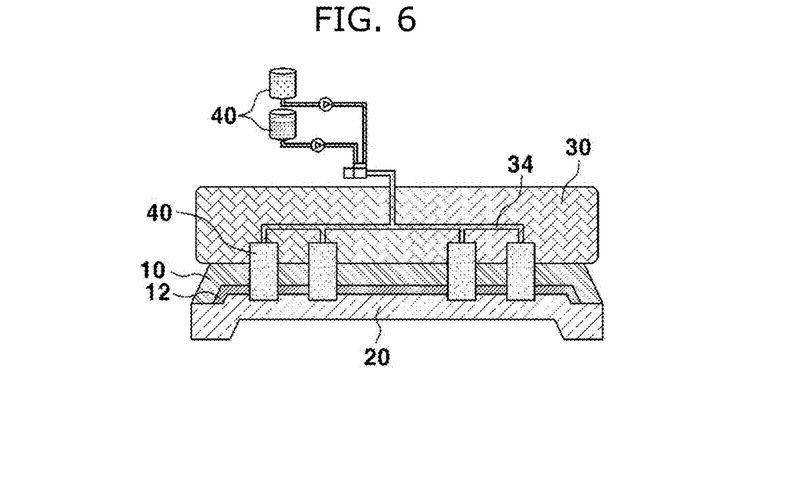

As illustrated in FIG. 6, the resin 40, such as an epoxy, is injection-molded into each of the plurality of light-transmitting regions A in a state in which the light-transmitting regions A extend.

In the first embodiment, the resin 40 is injected through a plurality of supply flow paths 34 formed in the silicon pad part 30 so that the resin 40 is supplied to each of the plurality of light-transmitting regions A.

Figure 7:
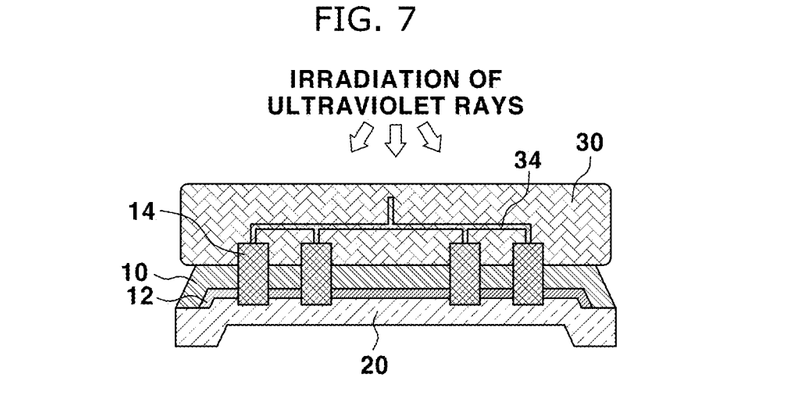

Subsequently, as illustrated in FIG. 7, the silicon pad part 30 is irradiated with ultraviolet rays to cure the resin 40 injection-molded into the light-transmitting region A, and in the cured state, the silicon pad part 30 is removed.

Figure 8:
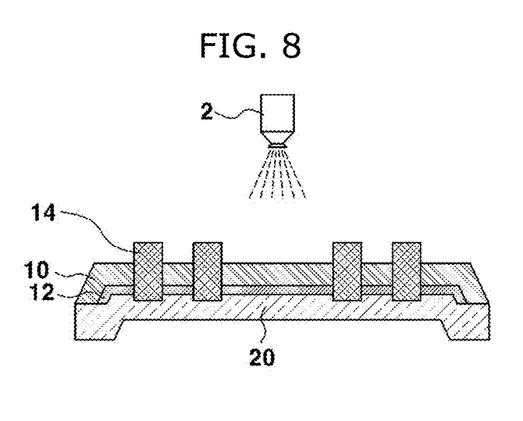
Figure 9A:
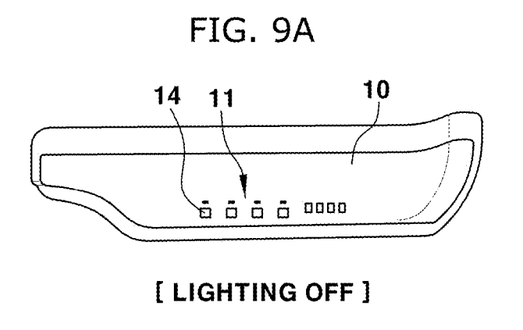
FIGS. 9A and 9B are views illustrating ON/OFF states of a light source unit in the method of manufacturing the interior component using the real material according to an embodiment of the present disclosure.
Figure 9B:
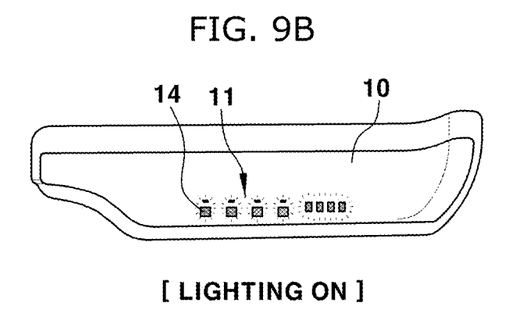

In the first embodiment, as illustrated in FIG. 8, when the silicon pad part 30 is removed from the real material 10, in a state in which the light-transmitting part 14 formed by curing the resin 40 protrudes from the front surface of the real material 10 by 0.2 cm, a waterproofing agent is applied to the front surface of the real material 10 through a waterproofing agent sprayer 2 so that the processing of the real material 10 is finished.

In the first embodiment, polyurethane (PU) having excellent impact absorption and waterproofing properties may be used as the waterproofing agent, for example.

Second Embodiment

Figure 10:
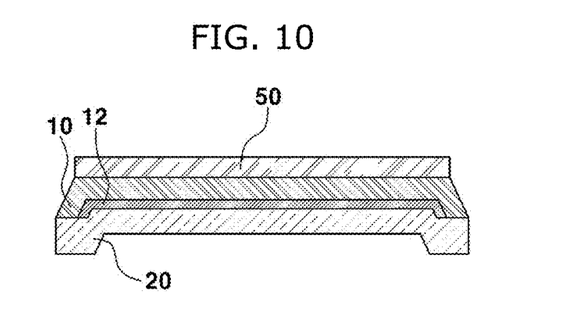
FIGS. 10 to 15 are views sequentially illustrating a second embodiment of an operation of forming the light-transmitting part in a method of manufacturing the interior component using the real material according to an embodiment of the present disclosure.

As illustrated in FIG. 10, in a second embodiment, a film 50 on which the symbol part 11 is printed is attached to the front surface of the real material 10.

In the second embodiment, because the film 50 is attached to the front surface of the real material 10 in a thickness of 0.2 cm, as the resin 40 injection-molded into the light-transmitting region A is cured later, the light-transmitting part 14 may also extend to protrude from the front surface of the real material 10 by 0.2 cm.

Figure 11:
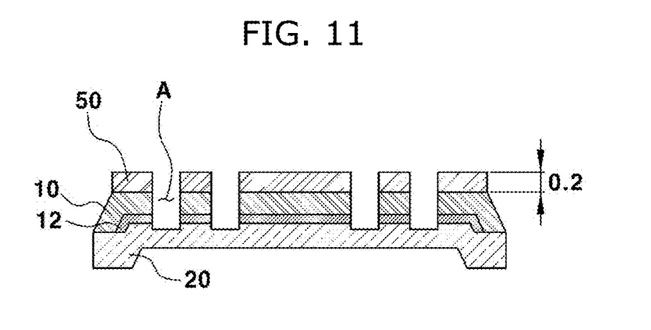

Thereafter, as illustrated in FIG. 11, laser processing is performed along the shape of the symbol part 11 printed on the front surface of the real material 10 to form the light-transmitting region A in the real material 10.

In the second embodiment, during laser processing, the light-transmitting region A is processed to be formed at a selected or predetermined depth including all of the film 50, the real material 10, the printed layer 12, and a portion of the injection-molded product 20, which is for allowing the real material 10 including the printed layer 12 and the injection-molded product 20 to be stably bonded without a gap as the resin 40 is injected and cured thereafter.

Figure 12:
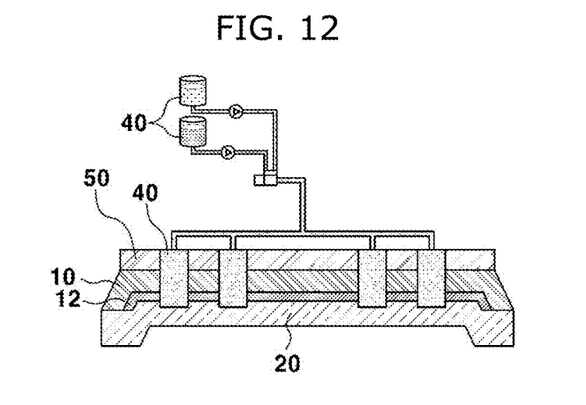

In a state in which the light-transmitting region A is formed through laser processing, as illustrated in FIG. 12, the resin 40, which in the second embodiment is an epoxy, is injection-molded into each of the plurality of light-transmitting regions A.

Figure 13:
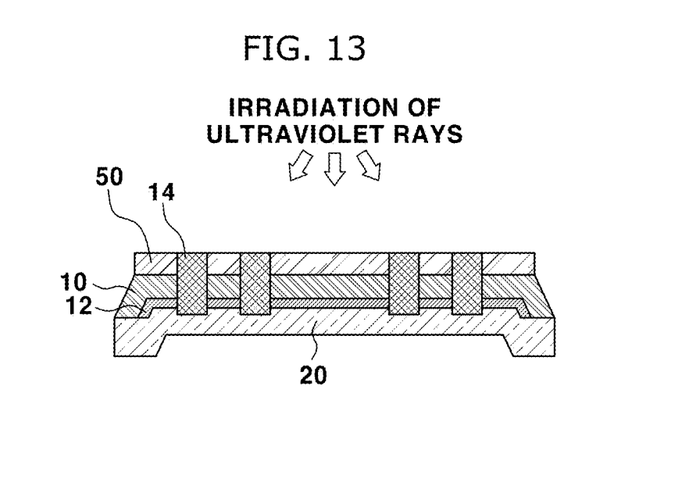
Figure 14:
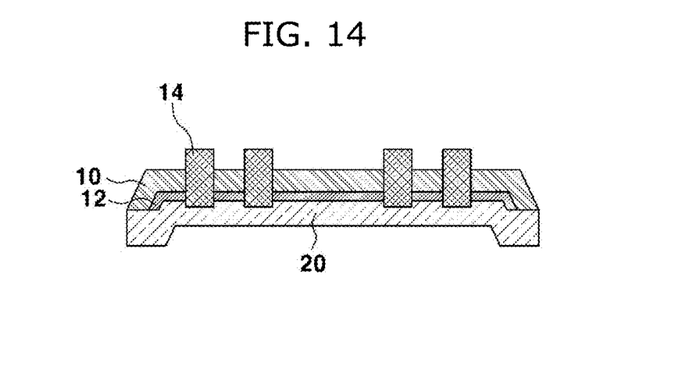

Subsequently, as illustrated in FIG. 13, the film 50 including the resin 40 is irradiated with ultraviolet rays to cure the resin 40 injection-molded into the light-transmitting region A, and in the cured state, as illustrated in FIG. 14, the film 50 is removed from the front surface of the real material 10.

Figure 15:
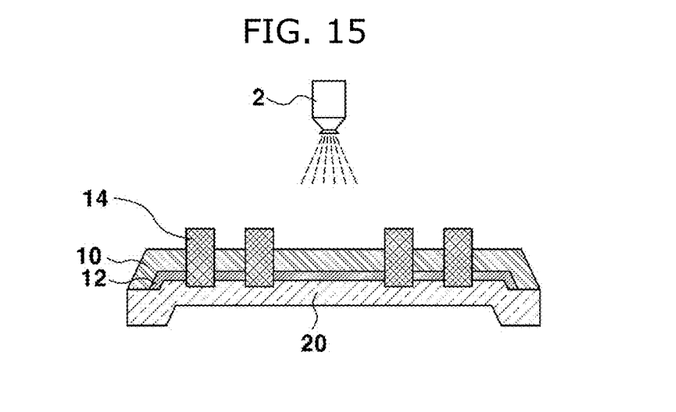

In the second embodiment, as illustrated in FIG. 15, when the film 50 is removed from the real material 10, in a state in which the light-transmitting part 14 formed by curing the resin 40 protrudes from the front surface of the real material 10 by 0.2 cm, the waterproofing agent is applied to the front surface of the real material 10 through the waterproofing agent spray 2 so that the processing of the real material 10 is finished.

In the second embodiment, polyurethane (PU) having excellent impact absorption and waterproofing properties may be used as the waterproofing agent.

Third Embodiment

Figure 16:
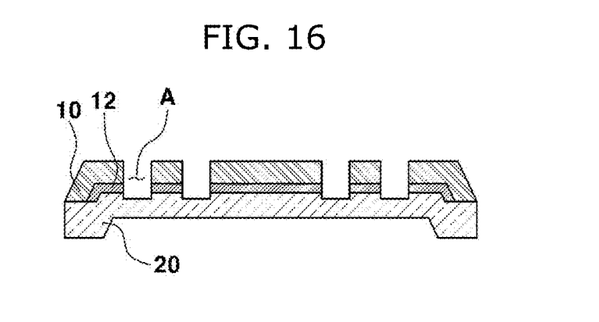
FIGS. 16 to 21 are views sequentially illustrating a third embodiment of an operation of forming the light-transmitting part in a method of manufacturing the interior component using the real material according to an embodiment of the present disclosure.

As illustrated in FIG. 16, in a third embodiment, laser processing is performed along the shape of the symbol part 11 printed on the front surface of the real material 10 to form the light-transmitting region A in the real material 10.

In the third embodiment, during laser processing, the light-transmitting region A is processed to be formed at a selected or predetermined depth including all of the real material 10, the printed layer 12, and a portion of the injection-molded product 20, which is for allowing the real material 10 including the printed layer 12 and the injection-molded product 20 to be stably bonded without a gap as the resin 40 filled in the light-transmitting region A is cured thereafter.

Figure 17:
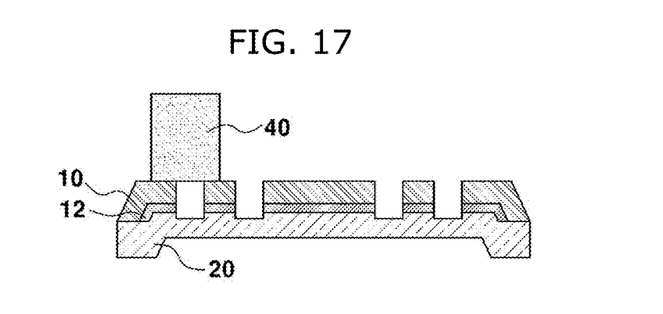

As illustrated in FIG. 17, in a state in which the light-transmitting region A is formed through laser processing, the resin 40, for example an epoxy, is applied to the front surface of the real material 10, and a resin layer having a selected or predetermined thickness is formed on the front surface of the real material 10 including the light-transmitting region A by pressing.

Figure 18:
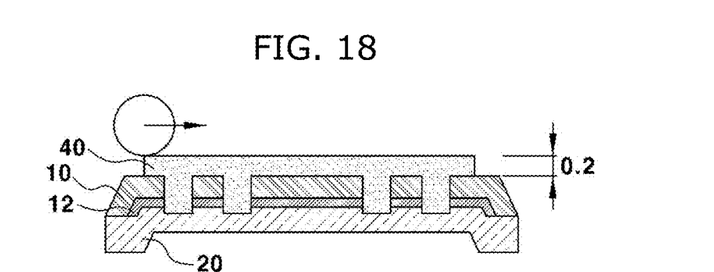
Figure 19:
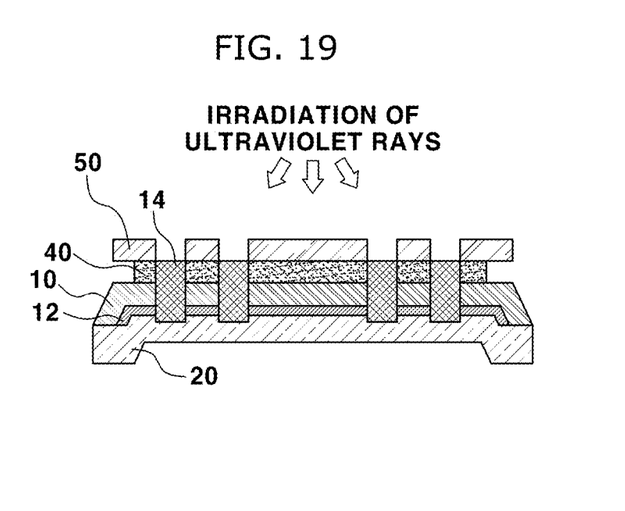

In the third embodiment, the resin layer may be processed in the form that is uniformly coated on the front surface of the real material as the resin 40 applied to the front surface of the real material 10 is pressed by a slot die method, and in the third embodiment, as illustrated in FIG. 18, because the resin layer is formed on the front surface of the real material 10 in a thickness of 0.2 cm, as the resin 40 is cured later, the light-transmitting part 14 may also extend to protrude from the front surface of the real material 10 by 0.2 cm.

Thereafter, the film 50 in which the symbol part 11 is printed on the front surface is positioned on the resin layer, and as illustrated in FIG. 18, the front surface of the real material 10 including the film 50 is irradiated with ultraviolet rays so that the resin 40 filled in the light-transmitting region A is selectively cured.

Figure 20:
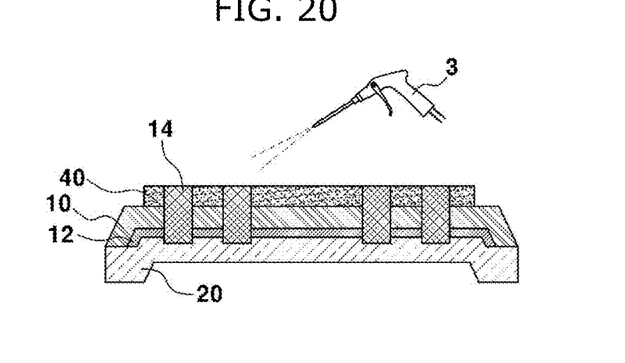

As described above, in a state in which the resin 40 is cured, as illustrated in FIG. 20, the film 50 and a resin layer not cured by the film 50 are sequentially removed from the real material 10 using an air gun 3.

Figure 21:
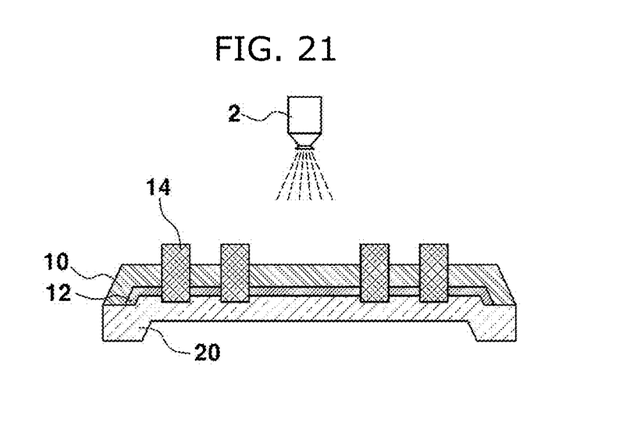

In the third embodiment, as illustrated in FIG. 21, when the film 50 and the non-cured resin layer are removed from the real material 10, in a state in which the light-transmitting part 14 formed by curing the resin 40 protrudes from the front surface of the real material 10 by 0.2 cm, a waterproofing agent is applied to the front surface of the real material 10 through the waterproofing agent sprayer 2 so that the processing of the real material 10 is finished.

In the third embodiment, polyurethane (PU) having excellent impact absorption and waterproofing properties may be used as the waterproofing agent.

Meanwhile, when the processing of the real material 10 is finished through any one of the first to third embodiments as described above (operation S300), a change in a capacitance is detected on the front surface of the real material 10, and thus a light source unit for selectively emitting light through the light-transmitting part 14 on a rear surface of the injection-molded product 20 (operation S400), and as illustrated in FIGS. 9A and 9B, as a change in a capacitance is detected by a user's touch or the like, the light source unit may be turned on and selectively lighted through the light-transmitting part 14.

In an embodiment, although the light source unit is not illustrated in the drawing, a substrate for mounting on the injection-molded product 20 is injection-molded into a shape corresponding to the processed shape of the real material 10, and a circuit region of the light source unit is formed on the substrate through laser processing so that a plurality of components including electronic elements for detecting the change in the capacitance and the turning-on of the light source unit and connectors are mounted therein, and thus it is possible to realize constant lighting uniformity and a sense of touch along a curved surface of the real material 10.

Figure 22:
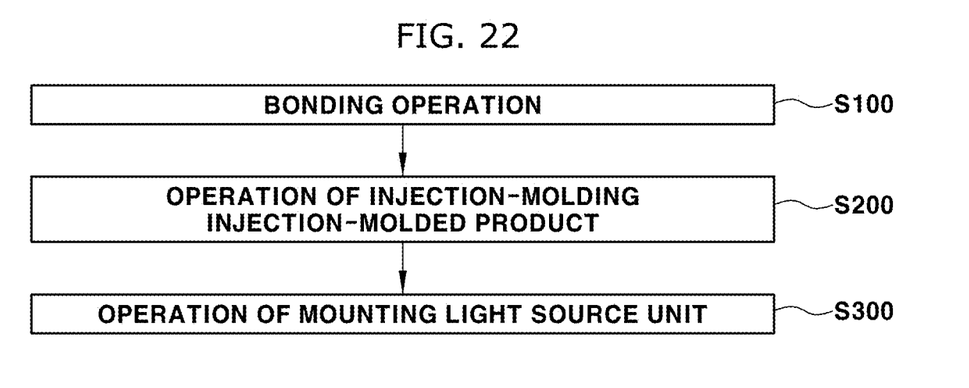
FIGS. 22, 24, and 25 are views sequentially illustrating a method of manufacturing an interior component using real material according to an embodiment of the present disclosure.
Figure 23:
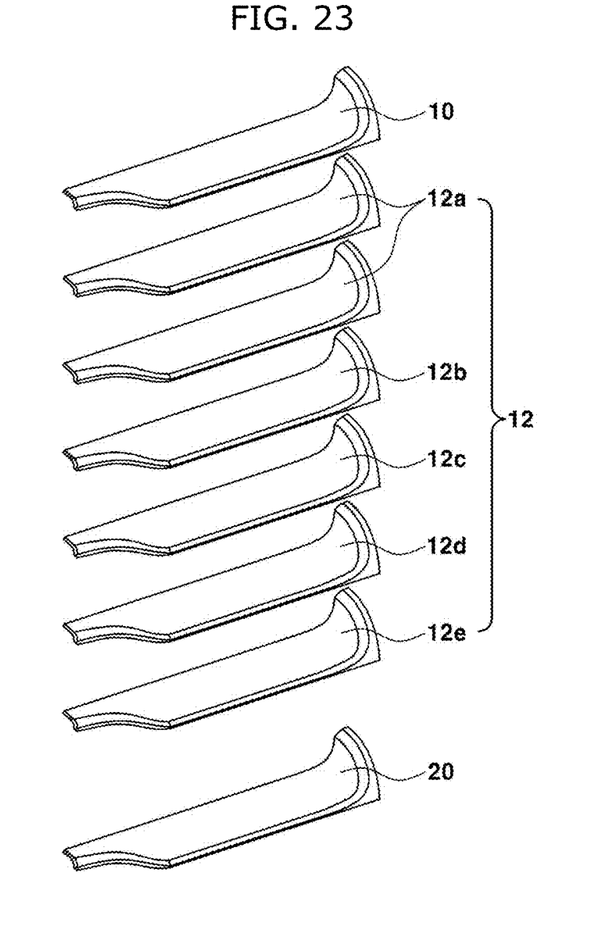
FIG. 23 is a view illustrating a printed layer in a method of manufacturing the interior component using the real material according to an embodiment of the present disclosure.
Figure 24:
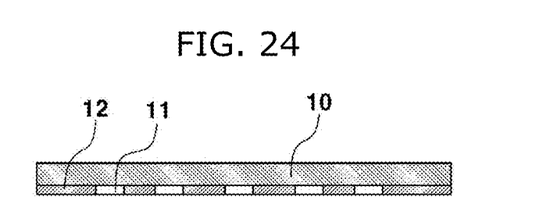
Figure 25:
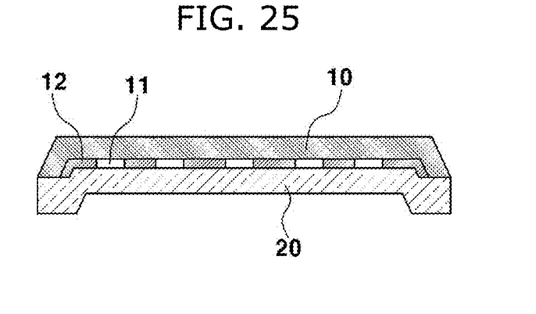

FIGS. 22, 24, and 25 are views sequentially illustrating a method of manufacturing an interior component using real material according to an embodiment of the present disclosure. FIG. 23 is a view illustrating a printed layer in a method of manufacturing the interior component using the real material according to an embodiment of the present disclosure.

As illustrated in FIG. 22, a method of manufacturing an interior component for a vehicle using a real material according to an embodiment will be sequentially described as follows.

First, as illustrated in FIG. 24, a plurality of printed layers 12 including a symbol part 11 are bonded to a rear surface of a real material 10 (operation S100).

This is for minimizing cracking and exterior damage of the real material 10 due to an impact or the like by providing a buffering effect for the real material 10 made of real wood by bonding the plurality of laminated printed layers 12 including the non-woven fabric 12*d* to the rear surface of the real material 10.

In other words, as illustrated in FIG. 23, for an embodiment, the printed layer 12 includes the backing 12*a* formed of a water-based adhesive and a PET film, the primer and black ink 12*b*, the thermoplastic polyurethane (TPU) 12*c*, the non-woven fabric 12*d*, and the formable layer 12*e*, and as described above, the plurality of laminated printed layers 12 are formed by adding the non-woven fabric 12*d* together with the TPU 12*c* made of an elastic material and provided to absorb an impact, thereby enabling buffering for real stone that can be easily broken (damaged).

Next, the real material 10 is put into the molding mold 1, processed into a required shape (see FIGS. 3A and 3B), and as illustrated in FIG. 25 for an embodiment, the real material 10 is laminated on the injection-molded product 20 injection-molded into the shape corresponding to the processed shape of the real material 10 (operation S200).

In this embodiment, the injection-molded product 20 is formed to transmit light, and because the real material 10 made of real stone also has excellent light transmittance, in a state in which the symbol part 11 is printed on the printed layer 12 and bonded to the rear surface of the real material 10, as described above, when the real material 10 is laminated on the injection-molded product 20 injection-molded, light may be transmitted from the front surface of the real material 10 and lighted in the shape of the symbol part 11 when the light source unit is turned on.

As described above, for an embodiment, when the processing of the real material 10 is finished (operation S200), the change in the capacitance on the front surface of the real material 10 may be detected, and thus the light source unit for selectively emitting light through the light-transmitting part 14 is mounted on the rear surface of the injection-molded product 20 (operation S300), and thus as the change in the capacitance is detected by a user's touch or the like, the light source unit is turned on and selectively lighted through the light-transmitting part 14.

In this embodiment, although the light source unit is not illustrated in the drawing, a substrate for mounting on the injection-molded product 20 is injection-molded into a shape corresponding to the processed shape of the real material 10, and the circuit region of the light source unit is formed on the substrate through laser processing so that the plurality of components including electronic elements for detecting the change in the capacitance and the turning-on of the light source unit and connectors are mounted therein, and thus it is possible to realize constant lighting uniformity and a sense of touch along the curved surface of the real material 10.

According to an embodiment of the present disclosure, it is possible to minimize breakage and exterior damage of the real materials through manufacturing considering the characteristics of the real materials even while securing visibility of the symbol on the front surface of the real material by manufacturing the interior component for a vehicle using the real material such as real wood and real stone, and manufacturing interior component in which the touch switch is applied to the front surface of the real material and the symbol corresponding to the touch switch is transmitted to the outside from the front surface of the real material by the light source.

In addition, according to an embodiment of the present disclosure, it is possible to realize lighting uniformity and the sense of touch for the symbol on the front surface of the real material by processing and mounting a light source module for allowing the symbol to be transmitted to the outside of the real material through injection-molding corresponding to the shape of the real material when the light source module is mounted.

The present disclosure has been described above with reference to embodiments illustrated in the drawings, but it can be understood that these are illustrative, and various modifications can be made from the present disclosure by those skilled in the art, and all or some of the above-described embodiments may also be configured in selective combinations thereof. Therefore, the technical scope of the present disclosure can be determined by the technical spirit of the appended claims.

What is claimed is:

1. A method of manufacturing an interior component for a vehicle using a real material, the method comprising:
    bonding a plurality of laminated printed layers on a rear surface of the real material;
    injection-molding an injection-molded product by putting the real material into a molding mold to form a shape;
    laminating the real material on the injection-molded product, wherein the injection molded product has a shape corresponding to the formed shape of the real material;
    forming a light-transmitting part that defines a symbol part on a front surface of the real material, the light-transmitting part protruding in a shape of the symbol part; and
    mounting a light source unit on the injection-molded product, the light source unit being configured to be selectively lighted through the light-transmitting part in response to detecting a change in a capacitance from the front surface of the real material,
    wherein the forming of the light-transmitting part comprises:
        performing laser processing along a shape of the symbol part printed on the front surface of the real material so that light-transmitting regions are formed in the real material;
        implementing an embossing that laminates a silicon pad part on the front surface of the real material and allows the light-transmitting regions to extend into the silicon pad part; and
        supplying a resin to the light-transmitting regions by injecting the resin through a plurality of supply flow paths formed in the silicon pad part.

2. The method of claim 1, wherein the injection-molding of the injection-molded product comprises processing a shape of the real material by simultaneously providing pressure and vacuum to the real material in a state of heating the molding mold.

3. The method of claim 1, wherein the bonding comprises bonding the plurality of laminated printed layers comprising a non-woven fabric on the rear surface of the real material.

4. The method of claim 1, wherein the forming of the light-transmitting part further comprises:
    curing the resin by irradiating ultraviolet rays to the silicon pad part; and
    removing the silicon pad part from the real material.

5. The method of claim 1, wherein the performing the laser processing comprises performing laser processing so that the light-transmitting regions are formed at a selected depth including a full depth of the real material, a full depth of the printed layers, and a partial depth of the injection-molded product.

6. The method of claim 1, wherein the implementing the embossing comprises forming a plurality of light-transmitting regions extending to a symbol processing part from the front surface of the real material in response to the symbol processing part having the same shape as the symbol part being engraved in the silicon pad part.

7. The method of claim 1, wherein the forming the light-transmitting part further comprises applying a waterproofing agent to the front surface of the real material in a state in which the light-transmitting part is formed to protrude from the front surface of the real material after the silicon pad part is removed.

8. A method of manufacturing an interior component for a vehicle using a real material, the method comprising:
    bonding a plurality of laminated printed layers on a rear surface of the real material;
    injection-molding an injection-molded product by putting the real material into a molding mold to form a shape;
    laminating the real material on the injection-molded product, wherein the injection molded product has a shape corresponding to the formed shape of the real material;
    forming a light-transmitting part that defines a symbol part on a front surface of the real material, the light-transmitting part protruding in a shape of the symbol part;
    mounting a light source unit on the injection-molded product, the light source unit being configured to be selectively lighted through the light-transmitting part in response to detecting a change in a capacitance from the front surface of the real material;
    attaching a film on which the symbol part is printed to the front surface of the real material;
    performing laser processing along a shape of the symbol part printed on the front surface of the film so that a light-transmitting region is formed in the real material;
    supplying a resin to the light-transmitting region by injecting the resin into the light-transmitting region through a supply flow path connected to the light-transmitting region;
    curing the resin by irradiating ultraviolet rays to the film including the light-transmitting region; and
    removing the film from the real material.

9. The method of claim 8, wherein the performing the laser processing comprises performing laser processing so that the light-transmitting region is formed at a selected depth including a full depth of the film, a full depth of the real material, a full depth of the printed layers, and a partial depth of the injection-molded product.

10. The method of claim 8, wherein the forming the light-transmitting part further comprises applying a waterproofing agent to the front surface of the real material in a state in which the light-transmitting part is formed to protrude from the front surface of the real material after the film is removed.

11. The method of claim 1, wherein the real material is real wood.

12. A method of manufacturing an interior component for a vehicle using a real material, comprising:
    bonding a plurality of laminated printed layers on a rear surface of the real material, the plurality of laminated printed layers including a non-woven fabric and a thermoplastic polyurethane (TPU);
    injection-molding an injection-molded product by putting the real material into a molding mold and laminating the real material on the injection-molded product injection-molded in a shape corresponding to a processed shape of the real material; and
    forming a light-transmitting part that defines a symbol part on a front surface of the real material, the light-transmitting part protruding in a shape of the symbol part;
    mounting a light source unit on the injection-molded product, the light source unit being configured to be selectively lighted through the light-transmitting part injection-molded product in response to detecting a change in a capacitance from the front surface of the real material;
    attaching a film on which the symbol part is printed to the front surface of the real material;
    performing laser processing along a shape of the symbol part printed on the front surface of the film so that a light-transmitting region is formed in the real material;

supplying a resin to the light-transmitting region by injecting the resin into the light-transmitting region through a supply flow path connected to the light-transmitting region;

curing the resin by irradiating ultraviolet rays to the film including the light-transmitting region; and removing the film from the real material.

13. The method of claim 12, wherein the injection-molding the injection-molded product comprises processing a shape of the real material by simultaneously providing pressure and vacuum to the real material in a state of heating the molding mold.

14. The method of claim 12, wherein the real material is real stone.

15. The method of claim 8, further comprising removing uncured portions of the resin.

16. The method of claim 8, wherein the laser processing is performed so that a plurality of light-transmitting regions are formed.

17. The method of claim 16, wherein supplying the resin comprises injecting the resin to each of the light-transmitting regions through a plurality of supply flow paths.

18. The method of claim 1, wherein forming the light-transmitting part further comprises curing the resin by irradiating ultraviolet rays to the silicon pad part.

\* \* \* \* \*